United States Patent [19]
Pritchard

[11] Patent Number: 5,061,135
[45] Date of Patent: Oct. 29, 1991

[54] THREAD TAPPING SCREW

[75] Inventor: Alan Pritchard, Baar, Switzerland

[73] Assignee: Research Engineering & Manufacturing, Inc., Middletown, R.I.

[21] Appl. No.: 574,476

[22] Filed: Aug. 28, 1990

[51] Int. Cl.$^5$ .............................................. F16B 35/04
[52] U.S. Cl. .................................................. 411/411
[58] Field of Search ................. 411/411, 378, 414, 423

[56] References Cited

U.S. PATENT DOCUMENTS

| | | | |
|---|---|---|---|
| 1,229,560 | 6/1917 | Whiteman | 411/411 |
| 2,827,820 | 3/1958 | Vellier | 411/411 |
| 3,748,949 | 7/1973 | Dreger | 411/411 |
| 4,527,932 | 7/1985 | Onasch et al. | 411/411 |

FOREIGN PATENT DOCUMENTS 876474 11/1942 France ................................. 411/411

*Primary Examiner*—Rodney M. Lindsey
*Attorney, Agent, or Firm*—Trexler, Bushnel, Giangiorgi & Blackstone, Ltd.

[57] ABSTRACT

A threaded fastener is presented of the thread-forming type, wherein there is defined, during driving thereof relative to a workpiece a combination of force couples and a resultant moment of force couples to develop material flow of the workpiece material about the threads to give face contact between the mating threads of the fastener and threads formed in the workpiece thereby for improved loading. The threaded fastener comprises a threaded body portion defining an axis and a driver head portion, and including a thread profile in axial cross-section having a plurality of zones including a first zone comprising a trailing thread face with respect to the direction of advancement of the fastener into the workpiece, which trailing thread face defines a first angle relative to the axis of the body portion and a second zone comprising a radiused forward thread face which defines a predetermined radius of curvature, such that the material of the workpiece is induced to flow, during thread forming, generally radially inwardly and forwardly with respect to the direction of advancement of the fastener relative to the workpiece toward the trailing angled face for increased surface contact therewith to thereby achieve a high friction between the mating threads of the workpiece and the trailing face and to reduce the tendency for the fastener and workpiece to become loosened under externally applied forces in service, and to give an improved relation of tapping torque to stripping torque, and to reduce hoop stress in the material of the workpiece.

8 Claims, 5 Drawing Sheets

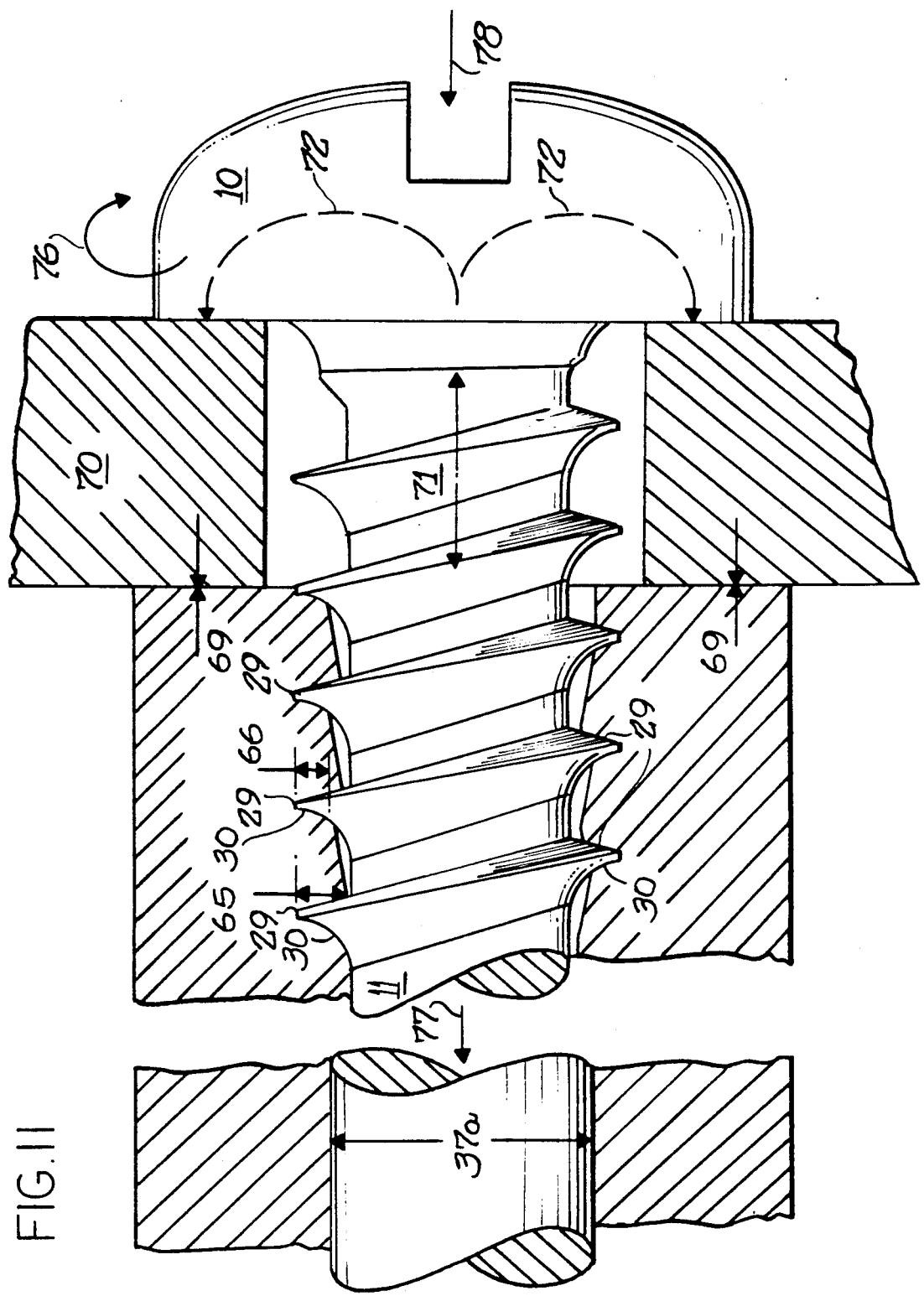

THREAD TAPPING SCREW

BACKGROUND OF THE INVENTION

This application is directed to improvements in a thread tapping screw, and more particularly to a novel and improved thread profile design for a thread tapping fastener. The novel thread profile in accordance with the invention is such as to improve the loading of the assembled threaded fastener and mating threads formed thereby upon driving into a workpiece so as to improve the loading that the resultant assembly can develop over that produced by other known thread forms.

Generally speaking, most male threaded fasteners which are used to effect a joint in relatively softer materials are of the self-threading or thread-forming type. Such fasteners are used, for example, in pliable plastic materials or in light alloy materials or nuts. These fasteners use the principal of plastic deformation of materials to produce, in the nut anchor or receiving workpiece pilot hole, a thread which mates with the male fastener thread. Generally speaking, thread designs used in these applications are of the spaced thread type, and are designed to give a good relationship between the tapping and stripping torques. Also of concern, particularly in these pliable plastic or light alloy materials is the hoop stress, or generally radially directed stress forces which are induced in the material by the formation of the thread due to driving of a self-threading or thread-forming fastener into the material.

Such pliable materials do not have the cold flow characteristics of harder materials such as steel, for example, and are in effect notch sensitive. By notch sensitive is meant the stress concentration which is found around the grooves or other discontinuities in a piece when stress or stretching forces are applies to the material. Plastics vary greatly in this regard, some being extremely pliable and others very brittle, and hence more notch sensitive. In any event, high stress concentrations applied during driving of a self-threading or thread-forming fastener tend to induce nut member or boss cracking which can compromise the effectiveness of the final joined assembly.

The term "boss", as used herein, refers to the general practice in plastic or other light or pliable materials to form an embossment or boss in the material about the area where a pilot hole is to be formed. Certain standards govern boss wall thickness relative to the size of the pilot hole and/or the nominal diameter of the fastener to be assembled therewith. Hence much of the so-called hoop stress applied to the material is in the boss wall thus defined. Any damage or cracking to the boss wall will, of course, detract from the effectiveness of the finished assembly. Finally, it is desirable in such assemblies to maintain the finished joined assembly in a condition of equilibrium even under external forces that may be applied to the jointed structure, such that the fastener and workpiece will not become loosened due to the effects of external forces applied thereto in service.

OBJECTS AND SUMMARY OF THE INVENTION

Accordingly, it is a general object of this invention to provide a threaded fastener having a novel and improved thread profile geometry which will enhance the performance capability of the fastener, when assembled with a nut or workpiece, over that of existing thread geometries.

A more specific object is to utilize a thread profile which will apply a differential loading to a nut or workpiece during driving of the fastener, which differential will tend to change the direction of component forces which make up the load and induce workpiece material flow in a direction that will reduce hoop stress and increase surface contact of the fastener and workpiece materials in areas where such contact will add to the resistance to nut thread stripping failure and enhance the ability to withstand axial pull-out loads.

Briefly, and in accordance with the foregoing objects the present invention comprises a threaded fastener of the thread-forming type wherein there is defined, during driving thereof relative to a workpiece, a combination of force couples and a resultant moment of said couples to develop material flow of the workpiece material about said threads to give face contact between the mating threads of the fastener and threads formed in the workpiece thereby for improved loading; said threaded fastener comprising: a threaded body portion defining an axis and a driver head portion, said threaded body portion including a thread profile in axial cross-section having a plurality of zones including a first zone comprising a trailing thread face with respect to the direction of advancement of the fastener into the workpiece, which trailing thread face defines a first angle relative to the axis of said body portion and a second zone comprising a radiused forward thread face which defines a predetermined radius of curvature, such that the material of the workpiece is induced to flow, during thread forming, generally radially inwardly and forwardly with respect to the direction of advancement of the fastener relative to the workpiece toward the trailing angled face for increased surface contact therewith to thereby achieve a high friction between the mating threads of the workpiece and the trailing face and to reduce the tendency for the fastener and workpiece to become loosened under externally applied forces in service, and to give an improved ralation of tapping torque to stripping torque, and to reduce hoop stress in the material of the workpiece.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawing in which like reference numerals identify like elements, and in which:

FIG. 11 is a schematic drawing of a completed assembly employing the fastener of the present invention.

DETAILED DESCRIPTION OF THE ILLUSTRATED EMBODIMENT

Figure 1:
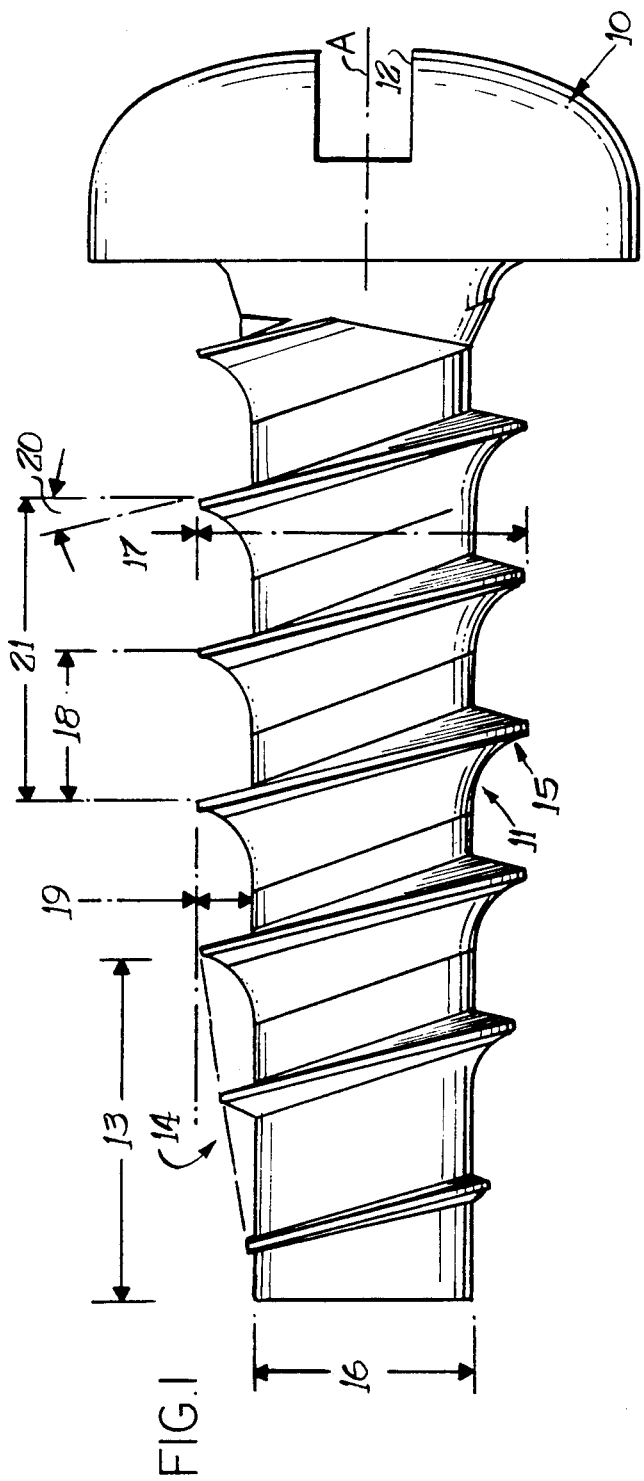
FIG. 1 is a schematic side elevational view of a fastener embodying the invention.

Referring now to FIG. 1 of the drawings, there is shown a self-tapping threaded fastener or screw in accordance with the invention having a head 10 and a shank or body portion 11.

The head 10 may be of any desired type and may have a cross-slot 12 or a cruciform recess therein or be provided with an external wrench engageable formation or may contain any other system that will allow rotational movement to be transmitted to the screw through a fastener driving system.

The illustrated shank 11 is generally, although the invention is not limited to, a cylindrical cross-section form and has a tapering entering end portion 14 that is illustrated as encompassing a length 13. The present invention is not limited to this tapered entry end portion and may, if desired, contain an entry end portion in the form of a drill tip of known form, or any other sort of entry end form desired.

The shank 11 has a nonsymmetrical thread 15 formed thereon over the whole length of the shank 11, though if desired the thread may extend over only a portion of the shank. The thread 15 is generated on a helical form, around the cylindrical core diameter 16. The magnitude of the helix angle or spiral angle 20 is determined by direct relationships between the screw outside diameter 17, and the depth 19 of the thread in conjunction with the screw pitch or lead 18.

The fastener shown in FIG. 1 is illustrated as being that of a single-start thread 15 formed around the core diameter 16 although the present invention will apply equally to that of a two start helical thread form developed around the cylindrical core diameter 16. In the case of a two-start helical thread form being developed around the core diameter 16, the magnitude of the helix or spiral angle 20 is determined by direct relationships between the screw outside diameter 17, the thread depth 19 and the thread lead 21 which equates in value to two times the screw pitch 18.

Figure 2:
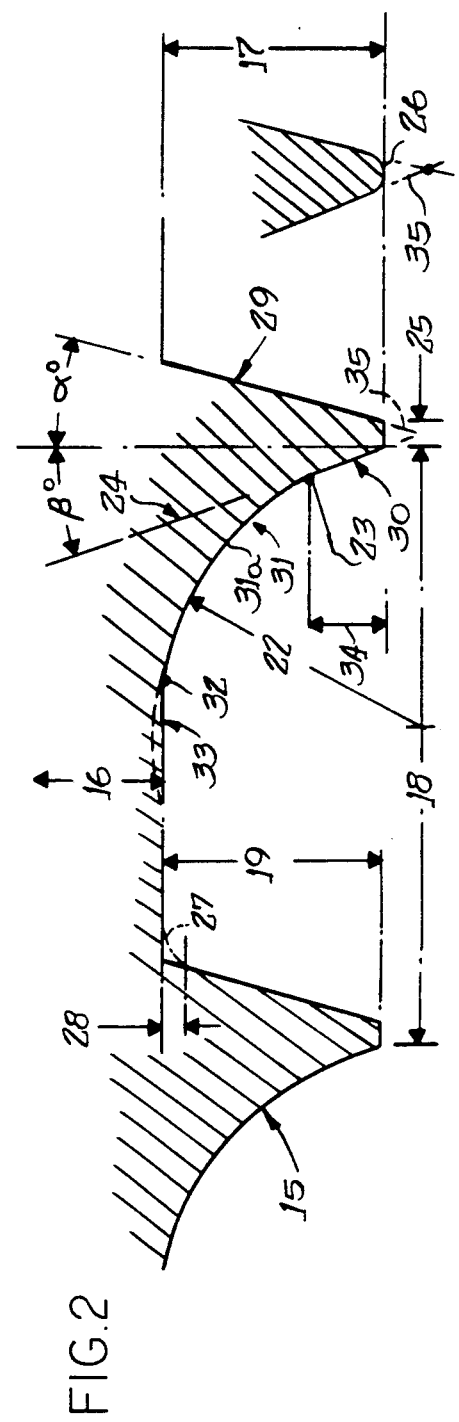
FIG. 2 is a diagrammatic illustration of thread form proportions in accordance with the invention.

Referring now to FIG. 2 of the drawings, there is shown an enlarged sectional drawing of the proportions developed for the thread profile geometry in accordance with the present invention. Thread profile depth 19 and thread pitch or lead 18 are those as previously discussed in reference to FIG. 1, as is the screw outside diameter 17.

It is preferred that the thread diameter 17 shall fall within an overall range of screw sizes between 1.4 mm and 10 mm diameter. For practical considerations, each screw should have a dimension that is nominally equal to a directly related, standard metric or imperial inch size self-tapping screw of the spaced thread type. However, the invention is not so limited with regard to either diameter or nominal size. The thread profile geometry of the present invention is as follows:

The trailing face 29 of the screw thread profile, (that being farthest away from the screw entry point on each sectioned profile) is angled in relation to the diameter (the diameter being 90° to the axis A of the cylindrical core) of the cylindrical core of the screw or fastener is shown as alpha°. The preferred magnitude of this angle is 15° (105° relative the axis A) although it may lie within the range of 10° to 15° (100° to 105° relative to the axis A). A tip 30 of the leading face 31 of the screw thread profile is angled relative to the core diameter as shown as beta°, the preferred angle beta° being 20° although it may lie within the range 17° to 25°. The magnitude of the radius of curved section 31a of the leading face 31 is preferably 0.22 times the nominal screw diameter or size 17, but may lie within the range 0.22–0.30 times nominal screw size.

The height 34 of this angled thread tip 30, below the outside diameter 17 of the screw has a preferred value that is 25% of the thread profile depth 19, although the tip height to intersection point 23 can be within the range 23% of thread depth 19 to 27% of thread depth 19.

The intersection of the radiused thread profile 31 and the cylindrical core 16 of the screw which occurs at 32 does not create a condition where the surface 33 of the core is tangential to the radius 22. A section of the core surface 33 will always have the effect of being chordal to the radius 22, as shown in broken line in FIG. 2.

The following dimensional relations relate to a preferred embodiment, and do not limit the invention in any way. The thread profile crest 25 can be flat or radiused as shown at 26. The "fatness" of the thread profile, at the tip, denoted by 25, when the faces 29 and 30 are projected to form a triangle with its apex at 35, should not exceed a real value 0.1 mm for screw nominal sizes 1.4 mm through 5 mm and should not exceed 0.20 mm for screw sizes 6 mm through 10 mm or the equivalent imperial inch sizes of screw.

At the intersection of the thread profile face 29 with the cylindrical core diameter 16 of the screw, there may be a permitted fillet radius 27. The maximum permitted radius should be that which will ensure that the height 28 of the intersection will not exceed 0.2 times the overall thread depth 19.

The axial pitch 18 of the helical thread shall preferably equate to 0.45 times the screw nominal diameter, but can be within the range 0.4 to 0.6 times the nominal screw size.

The above-described thread profile geometry in accordance with the present invention creates improved performance conditions by way of generating material flow of nut or other workpiece anchor materials. This material flow is created by the inventive nature of the above-described geometry to develop force reactions and moments of forces. These forces are generated in a manner which will induce nut material flow, during the self-tapping operation, to generate mating thread contact which gives higher joint assembly performance than would to created by other, known thread profile forms, e.g., those which are of substantially triangular form and have geometries that are symmetrical about an imaginary line which is perpendicular to the screw axis.

The development of thread forming fasteners for use in an anchor material which is a synthetic pliable plastic material or other materials into which spaced-threaded self-tapping screws are used, has been ongoing for a number of years.

The basic analyses which have been presented for innovative thread profile design have generally been related to changes to the thread profile angles and the screw axial pitch or lead which would, by way of force diagrams, show the products to have improved axial load carrying characteristics and to improve the conditions related to high induced, hoop or radial stresses that are developed in the nut or workpiece or anchor material during the thread-forming operation.

Figure 3:
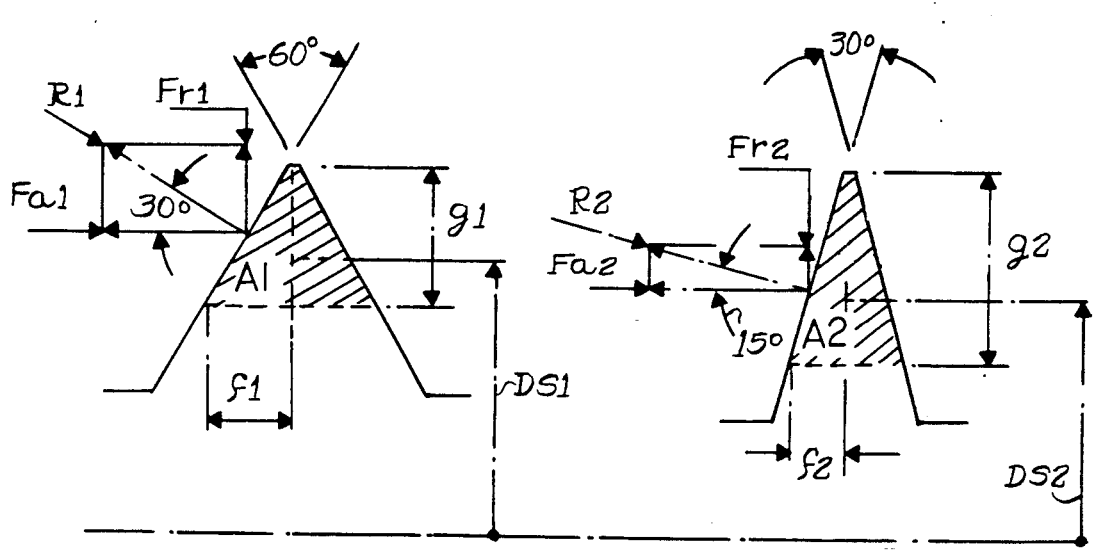
FIG. 3 is a diagrammatic illustration of force vectors associated with conventional thread profile angles.

One such analysis, illustrated in FIG. 3, shows that by the use of vector diagrams and material area displacement formulae, using a two dimensional analysis, advantages occur, both in the magnitude of forces Fa2 and Fr2 over Fa1 and Fr1, should the thread flank angle be reduced from the initial investigation size of 60° inclusive, to the improved size of 30° inclusive, and that the torque necessary to form a mating thread, assuming equal area displacements, can be reduced by this practice from its initial 60° inclusive to 30° inclusive.

It can be shown that for conditions of equal area displacement (A1=A2) that by reducing the thread angle from 60° to 30°. there will be developed an increase in the mating thread flank engagement lengths (g2 being greater than g1). The analysis relates to the internal forces developed and those which need to be applied for the screw to be inserted into a nut anchor of synthetic pliable plastic materials. On the premise that all other factors are equal, this basic analysis can be a useful indicator of the relative features which can be developed by a change to the thread flank angles of symmetrical thread forms which are of substantially triangular cross-section geometry.

While the foregoing analysis is useful as an indicator, it does not consider the forces which are induced into the anchor material during the female thread-forming movement, and the direction of material movement, in order to produce the desired effect of having mating male and female threads produced by self-tapping nut thread principles.

Figure 4:
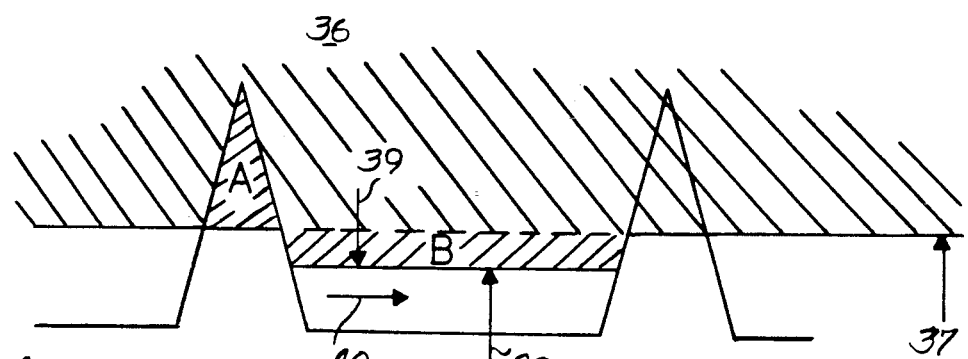
FIG. 4 is a diagrammatic illustration of a thread form as in FIG. 3, engaging a workpiece.

The basic principle used in the development of this self-tapping concept is illustrated in FIG. 4. A nut or other workpiece element 36 is provided with a plain hole bore of diameter 37. A screw is applied into this plain bore, by rotational means, and thus creates anchor material volume displacement. The material is displaced in a radial inward direction, as noted by arrow 39 and an axial displacement, as denoted by arrow 40 until such time as a state of equilibrium is reached, where the volume displaced by the thread form A equates to the volume B generated in the nut member 36. This increases the radial thread engagement of the mating parts, the effective workpiece thread minor diameter 38 being reduced below that of the initial plain bore diameter 37.

This concept and the theoretical approaches taken to develop it by equal volume displacement analysis does not take into account the internal forces generated and needed to induce the material flow in the directions indicated by arrow 39 and 40.

Figure 5:
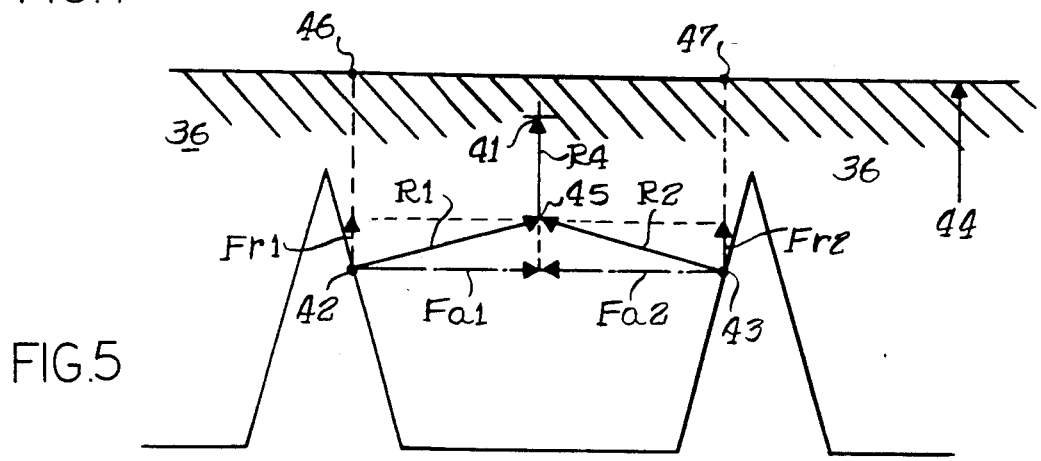
FIG. 5 is a diagrammatic illustration of vector forces that induce material flow, during thread forming by the thread shown in FIGS. 3 and 4.

FIG. 5 illustrates an extension of the vector diagram analysis of FIG. 3. For a symmetrical thread form of substantially triangular geometry, the component forces Fr1 and Fa1 develop a vectorial resultant force R1. Similarly, component forces Fr2 and Fa2 develop a vectorial resultant force R2, and $R1 = R2$
$Fa1 = Fa2$
$Fr1 = Fr2$ Resultant forces R1 and R2 will, in turn, create a vectorial resultant force R4 due to their interrelated reactions at point 45. The magnitude of the forces developed in the system are directly related to the material volumes being displaced and the strength, or modulus of rigidity, of the anchor material.

The forces developed will have a highest value at point 42 for Fa1 and Fr1 and at point 43 for Fa2 and Fr2 and will be reduced in actual values as the forces are subject to a counter-reaction effect from the strength of the nut anchor material. Thus Fa1 will reduce from a maximum at point 42 to a minimum at point 46 and Fa2 will reduce from a maximum at point 43 to a minimum at point 47. This force reduction will follow a linear regression and design objectives are to ensure that zero load, or near zero load will prevail at points 46 and 47 and that the boss diameter 44 is sufficiently large to meet this need when related to the screw size and the energy that needs to be contained when forming the nut thread.

With the acceptance that the forces induced into the anchor material need to be contained within the physical structure of the component parts, it follows that there will be reactive forces that develop and, by vector diagram analysis, reactions to the resultant forces developed. It is these reactions to the forces that allow for the nut member materials to flow inwardly and create increased mating thread flank engagement utilizing thread forming concepts.

Figure 6:
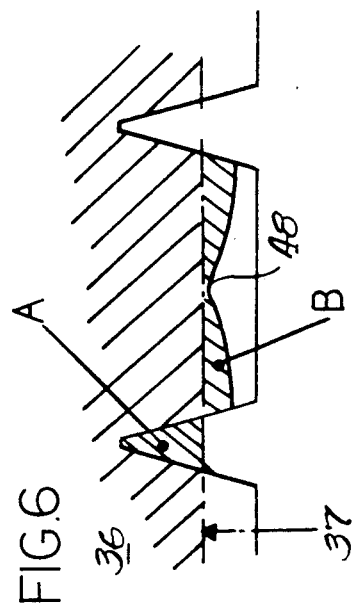
FIG. 6 is a diagrammatic illustration of the conditions found in the workpiece thread formed by the fastener of FIGS. 3–5.

With decreasing values of the reactions to the forces Fa1 and Fr1, the resultant force R1 also reduces in value, and there is seen a combined reduction in the forces available to induce nut material movement in an inward direction. This is partially countered by the increased influence that the reaction to the resultant force R4 has on the assembled system. The combined influence of these varying loads is to produce a nut thread core configuration that is of a nature that is indicated in FIG. 6 where volume displacement A is equal to volume displacement B for a pilot hole 37 as defined in reference to FIG. 4.

However, a void 48 is created in the nut thread member which reduces its ability to withstand the negative effect of axial withdrawal forces being applied to the jointed assembly, below that which is indicated in the theoretical thread form developed and related to FIG. 4. The formation of such voids 48 has been in evidence when spaced threaded type, symmetrical triangular thread form geometry fasteners have been used to produce a mating thread, in an unthreaded nut anchor material. This is particularly noticeable where the nut anchor material is of a synthetic pliable plastic type.

It is an object of the present invention to develop further the technology of thread-forming in a manner that relates the thread profile geometry to the creation of forces, within the nut member, during thread formation and the resultants of these forces, such that nut member material flow is generated in a manner and direction that will enhance and improve the unit assembly performance above that which has been seen and recorded for thread form geometries that are of the spaced thread type and have have thread profiles that are symmetrical and substantially of triangular form.

The preferred thread profile geometry of the present invention is that which has been previously described with reference to FIGS. 1 and 2.

There now follows descriptions of the method by which the inventive nature of the thread profile form, in accordance with the present invention, produces improved results when used to develop a mating nut or other workpiece and screw assembly where the base nut or anchor material is synthetic pliable plastic material. It will be understood, however, that the screw of the present invention may also be used, to good effect, in all other materials into which spaced-threaded, self-tapping screws of the thread-forming type, may be applied.

Figure 7:
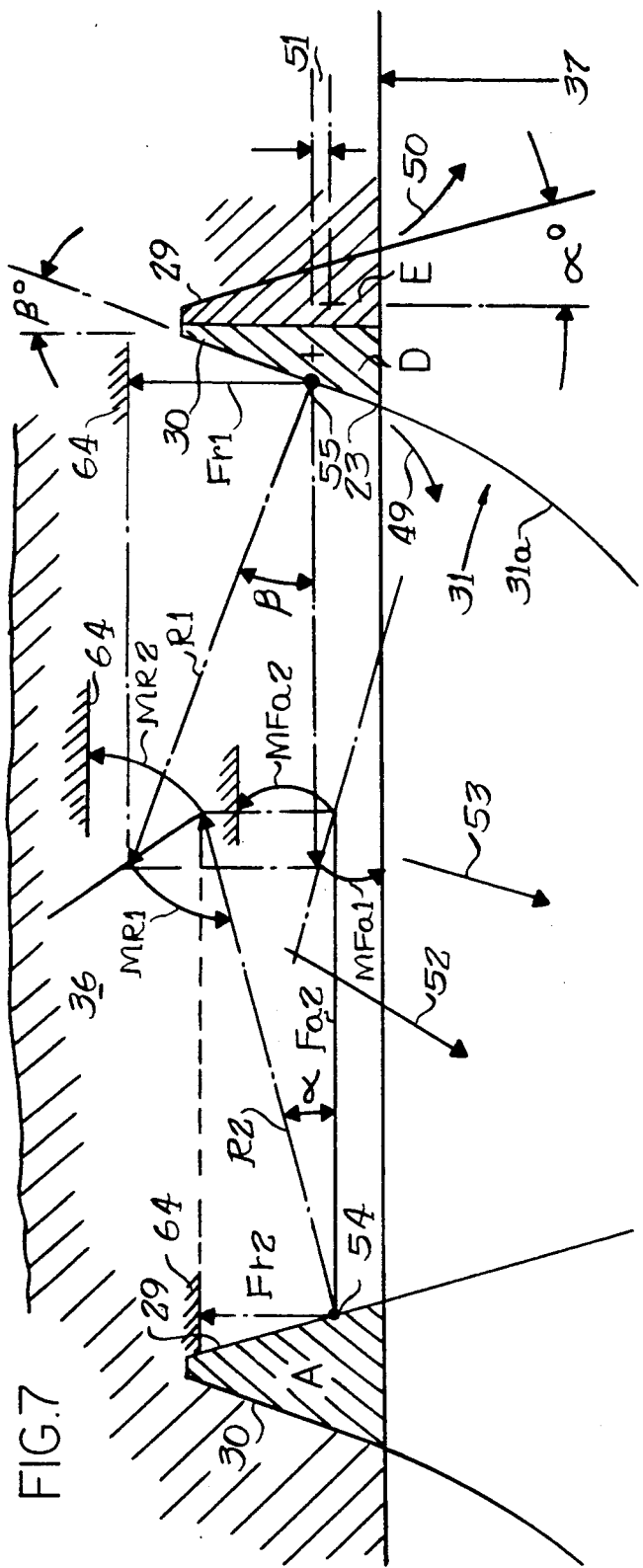
FIG. 7 is a vector force diagram developed from the asymmetric thread tip geometry of the present invention.

With reference to FIG. 7, there is shown a partial cross-sectional elevation of the tip form and of adjacent axial thread profiles in accordance with the present invention. The thread tip is asymmetrical in geometry and angle beta is greater than angle alpha. The relative proportions of these angles is in accordance with that previously described.

There is indicated a plain hole bore 37 which has been provided in the nut or other workpiece or boss element 36 and into which the screw in accordance with the present invention is to be inserted and to provide a mating nut and screw thread condition by self-tapping action. The volume of material being displaced can be such that volume displacement D equates to volume displacement E and such that the total of volumes D and E equate to A. Such displacements will induce nut member material flow, of relative proportions in a perceived direction that approximates to that shown by arrows 49 and 50 respectively.

With volume displacements D and E being substantially equal, it follows that the forces exerted within and upon the nut member material can be developed by vector diagram analysis and that the applied forces, although having a substantially equal resultant force, as denoted by R1 and R2, will have varying component forces Fa1, Fr1 and Fa2, Fr2 such differences being directly related to the differing proportions of the thread crest tip geometry. The position from which these forces are developed, in line with vector diagram analysis concepts will be directly related to the centroids of the areas D and E and related to the thread face profiles 29 and 31, such that the force diagrams are related to points 54 and 55. By the nature of the above-described thread crest tip geometry, a relative height differential 51 exists between points 54 and 55 such that point 55 is located radially outwardly of the position of point 54.

As a direct result of the thread tip geometry, in accordance with the present invention, it is seen that the following conditions prevail:

Resultant forces R1 and R2 are substantially equal in magnitude.

The relative differences of the face angles, as denoted by alpha and beta result in related directional changes to these forces.

The radial component force Fr2 is reduced below that of Fr1 by the direct relationships between the tangent of angle alpha and the tangent of angle beta.

The magnitude of the differing values of Fr1 and that of Fr2 is on the order of 3% in relation to the thread geometry of the present invention. For practical considerations and the relative levels of additional hoop stresses that can be induced into the boss or nut member, this small difference is considered to be of little consequence.

The axial component forces Fa2 and Fa1 are once again directly related, in magnitude, to the differing values of the tangent of angle alpha and angle beta, respectively.

Under conditions of induced forces acting upon the boss or nut anchor material in accordance with the present invention, and the relative magnitudes and directions of the forces and resultant forces that are applied, in order to achieve a state of equilibrium within the structure, further induced force couples and resulting forces are developed from the moment of these couples that influence the material movement of the nut anchor material during the formation of the mating nut thread. The moments of forces that are developed from the effect of the induced force couples are denoted by MR1 and MR2 in relation to R1 and R2 and MFa1 and MFa2 in relation to Fa1 and Fa2.

The resultant effects of the moments of forces MR1 and MFa1 have the most effect on producing the nut anchor material flow in a direction such that improved mating thread contact and the directly related requirements for improved jointed assembly performance are achieved in the contact or nut and screw thread being encouraged to take place along the face of the thread profile 29.

While MR1 and MR2 are equal as are MFa1 and MFa2, it would follow that the respective influences of these forces would be negated should equal restraints to these forces be in evidence. However, for practical considerations and in line with self-tapping principles as applied to the formation of a mating female thread in a synthetic pliable plastic material, there is a need to establish the relative proportions of the screw and nut member.

Figure 8:
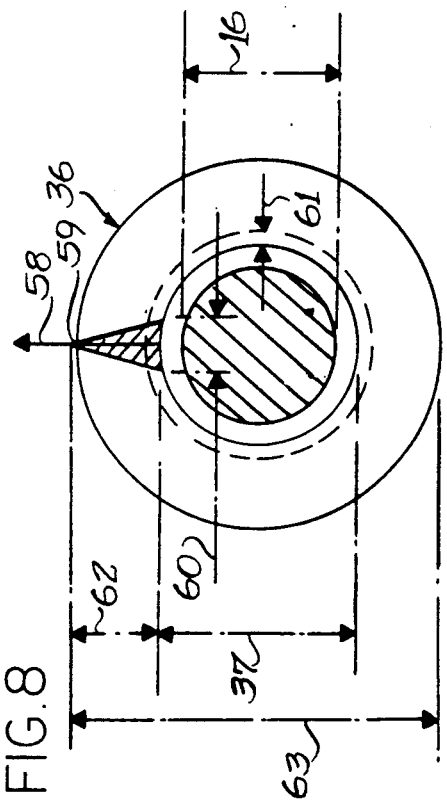
FIG. 8 is a diagram of boss proportions to contain radial loads induced by self-tapping.

Referring now to FIG. 8, these related proportions will be discussed on a schematic basis:

A plain diameter bore 37 is provided in a cylindrical boss of diameter 63;

Into this bore is applied a self-tapping screw;

The development of the thread form in the boss member creates radial forces that act upon and must be contained within the boss proportions;

The objective is to develop the boss wall thickness 62 such that the combination of all radially outward forces 58 are dispersed and distributed throughout the boss material in a manner that creates a zero load and zero stress condition at the outer wall surface of the boss;

The maximum forces and consequential stress are toward the center of the boss and illustrated, schematically, by the length 60 and reducing to zero at point 59;

Failure to maintain the boss wall thickness of sufficient magnitude to ensure that zero stress is developed at the outside periphery of the boss, will encourage the boss material to move radially outward and create "swelling".

This basic concept relates to all designs associated with self-tapping screw assembly concepts and is not limited to the present invention. It is provided as a basis of further understanding and elaborating the innovative concepts herein presented in relation to the development of nut anchor material flow in the preferred direction.

With further reference to FIG. 7, it can be seen that forces Fr1, Fr2, MR2 and MFa2 are those which have a radial outward direction and are those which have to be restricted, by the boss design, as discussed with reference to FIG. 8. The restriction to the outward force effects, developed by these forces are, for illustration purposes, denoted by imaginary retaining barriers 64. From the influence of these barriers 64, there is developed reaction forces to Fr1, Fr2, MR2 and MFa2 that will add to the forces and the consequential stresses that are induced into the nut anchor material due to the relative proportions of the nut member in relation to the material being displaced by self-tapping principles. These forces are applied in a direction which is substantially toward the axis of the screw.

The forces MR1 and MFa1 which act upon the nut material in a direction that does not, by nut member design concept as illustrated in reference to FIG. 8, restrict these forces in a manner to achieve initial zero stress.

These forces MR1 and MFa1, in conjunction with the reaction forces developed from Fr1, Fr2, MR2 and MFa2, add to the stresses induced in the nut material with forces that are acting in an inward direction and, in combination, due to the asymmetrical tip design of the thread form in accordance with the present invention, encourage nut material to flow generally in a direction shown by arrows 52 and 53.

The reaction to forces Fr1 and Fr2 will also create inward nut material movement along and controlled by the thread profile faces 29, respectively, and these forces will have the basic effect stated although influenced by other force considerations.

While initial advantages are determined as being created by the nut anchor geometry in accordance with FIG. 7, the proportional amount of material being displaced will not, on its own, be sufficient to develop significant increases in the mating thread flank engagement to generate the desired resistance to axial loads being applied to the jointed structure. Thus, for practical considerations, there will be determined a plain bore hole 37 in the nut anchor 36 in relation to the screw diameter size 17 (FIG. 1), together with the geometry of the screw in accordance with the present invention, such that material volume displaced in the nut anchor material, denoted by A, is sufficiently large to generate the required increase in mating thread flank engagement of the nut and screw threads when assembled by self-tapping principles.

Figure 9:
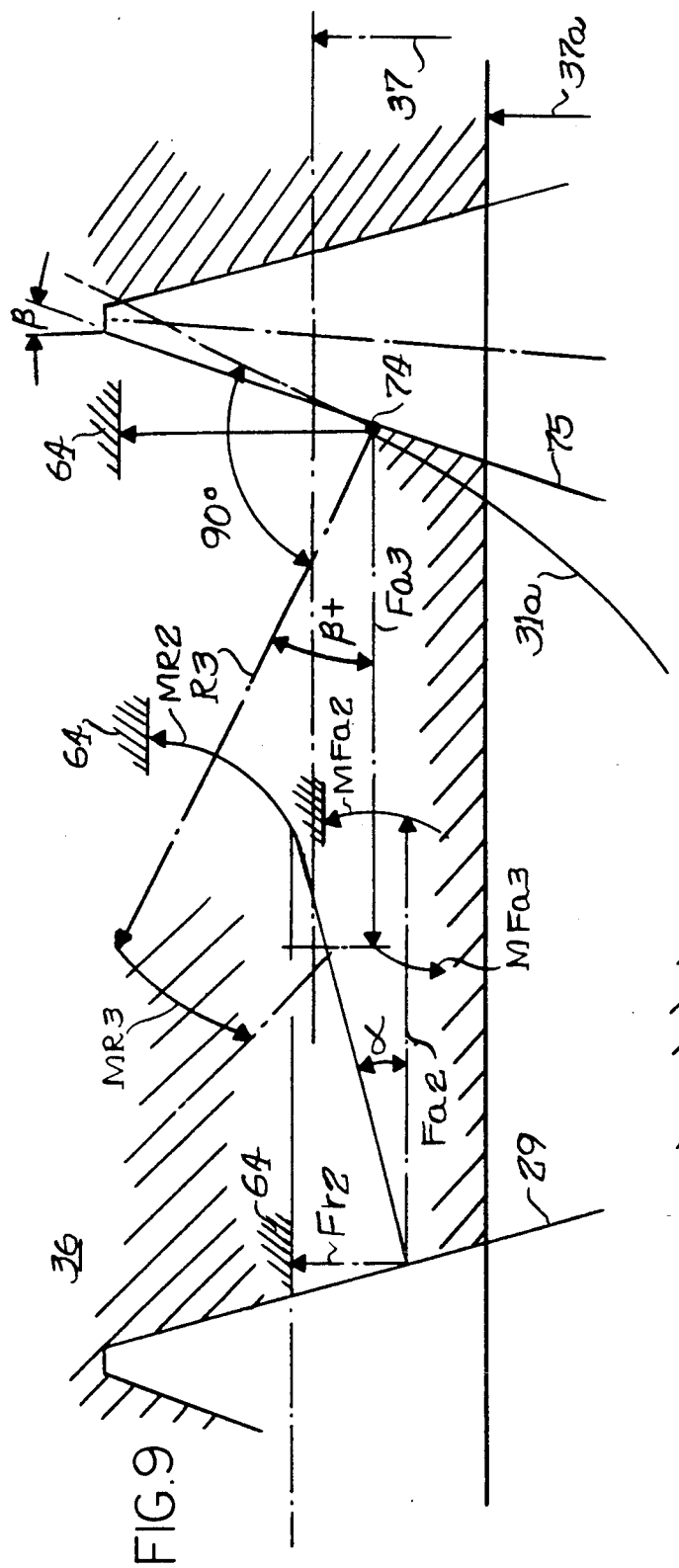
FIG. 9 is a diagram of vector forces that are induced from the concave thread profile section of the geometry of the present invention.

Referring now to FIG. 9, there is shown a condition where the plain bore hole in the nut anchor member has been reduced in size from that denoted as 37 to 37a in accordance with the above requirement. It is seen that the reduced plain bore hole diameter 37a develops a condition whereby the concave portion 31a of the leading thread profile flank 31 further influences the forces that are developed and contained with the anchor nut element 36 during the thread forming of the nut member by self-tapping principles.

The reduced proportions of the plain bore hole 37a will create conditions where more material will be displaced during the insertion of the screw in accordance with the present invention. The displacement of this material will require higher energy to induce the required nut material movement above that which would be required had the plain bore hole been retained in the larger diameter size as denoted by 37. Thus while the magnitude of the force R2 is greater than that which was present under the conditions which were discussed with reference to FIG. 7, the inter-related proportions of R2 and the component forces Fr2 and Fa2 remain unaltered.

In the conditions which prevail in FIG. 9, the force R3 and the component forces Fr3 and Fa3 due to the increased forces that emanate from a new point 74, where the direction of the force R3 is perpendicular to the tangential line of the concave face 31a, there will not be seen a proportional change when related to forces R1, Fr1 and Fa1 which were discussed with reference to FIG. 7.

The effect of the concave face 31a, together with the increased pressure (force) that is exerted at point 74, is to increase the resultant force R3 over and above that which would have been developed had the leading thread profile face angle beta been continued toward the center axis as denoted by the extension line 75. Thus R3 does not have a linear relationship to R1 (FIG. 7). In addition, the direction of the force R3 is varied, under the influence of the concave face 31a in a manner which increases its angular relationship from beta to beta plus. Thus the relationships between the component forces Fr3 and Fa3 are not maintained in the same proportions of Fr1 and Fa1 previously discussed (FIG. 7).

As a further consideration, it will be seen that further increases occur in the angle beta plus as the point 74 moves further inwardly down the concave face 31a; i.e., relative to point 55 in FIG. 7.

The development of the induced force R3 and its magnitude and direction will increase the force moments MR3 which will become equal to MR2 once a state of equilibrium has been achieved However, the increased magnitude of this moment of force MR3, will generate higher forces and consequential stresses in the nut anchor material 36 before a state of equilibrium is reached; such forces being downwardly, inwardly and toward the trailing face 29 of the thread form geometry.

Imaginary barriers 64 will continue to restrain the effects of the substantially radial directions of the forces Fr2, Fr3, MR2 and MFa2 to develop reactionary forces that will further increase downward and inward loads and develop stresses in the nut anchor material which are not able to be contained within the initial position of the plain bore 37a and will result in cold flow, under pressure, of the nut anchor material that is induced in a direction to accomplish the best possible contact, between the screw thread of the present invention and the mating nut thread produced by self-tapping principles.

Figure 10:
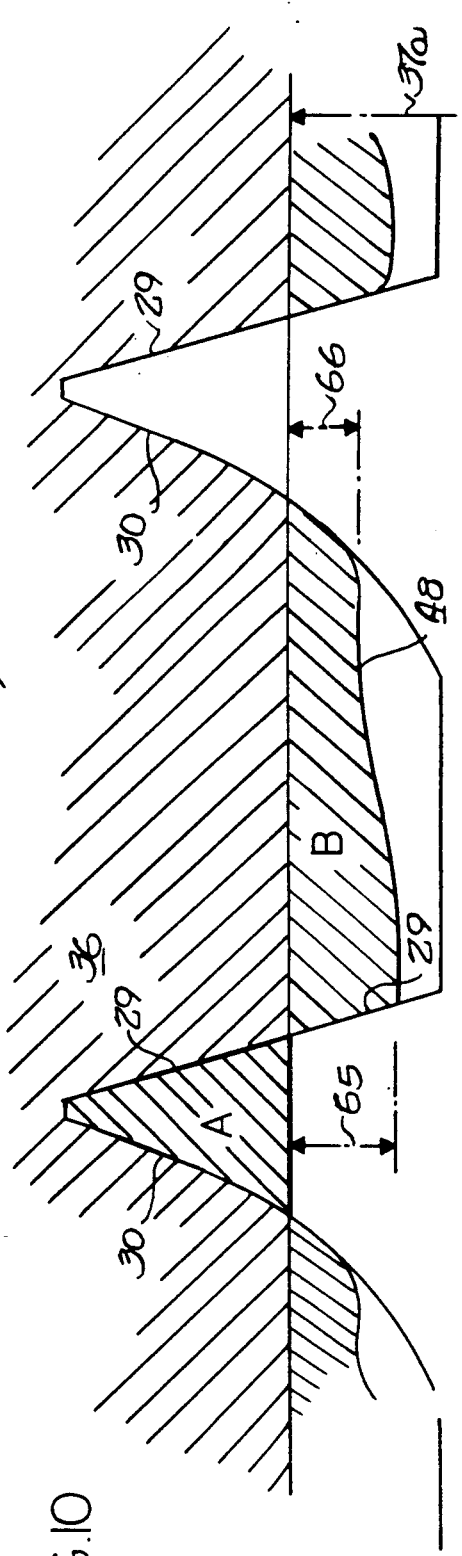
FIG. 10 is a diagram of the workpiece material movement generated by the thread forms of the present invention.

In combination, the asymmetrical thread tip in association with the concave thread configuration in accordance with the present invention induces internal force generation, within a nut anchor material of synthetic pliable plastic which generates couples and the resultant force moments of such couples which encourages nut material flow during a self-tapping operation, in the order and of the nature of that sketched in FIG. 10.

The directional flow of the nut material generated by the induced forces increase the effective depth of the thread profile at 65 above that which occurs at 66. Volume A will equate to volume B when the assembly reaches a state of equilibrium. Any voids 48 which may develop in the resulting nut thread core will be farther away from the thread contact face 29 than would occur should the thread profile geometry be of a symmetrical, triangular form, as discussed hereinabove.

The benefits which can be attributed to the use of the present invention and relate to the improved load carrying characteristics of the screw and nut assembly that has been effected using self-tapping principles can be further appreciated with reference to FIG. 11.

The screw is inserted into a plain hole bore 37a contained within a boss member 36, by rotation of the screw as indicated at 76. The screw moves axially forward 77 under the influence of the rotation 76 of the helical form of the screw thread generated around a cylindrical bore, and initial "starting" end pressure 78 being exerted in the direction shown. As the screw moves forward under the above-mentioned influence, there is created a condition of deformation of the nut anchor material in a manner that increases the thread profile depth contact of the mating threads, as a consequence of the thread profile form of the present invention. This deformation in a manner that increases the radial contact height 65 is created, above the voids that would be created using a thread form of symmetrical triangular geometry.

At the position where the contact areas of the boss 36 and a clamp plate 70 start to have an influence upon each other, continued rotation of the screw creates a tensile force as indicated at 71. This tensile force transmits through the head 10, along path 72, through the clamp plate 70 and creates a compressive force 69 that clamps component parts 36 and 70 together. The tensile force 71 will not and cannot be developed without being resisted by the trailing faces 29 of the thread profiles together with its mating contact in the nut thread formed.

The forward facing thread profiles 31 have no detectable influence on the capabilities of the mating threads to carry the required tensile loads other than that of having sufficient "fatness" to stop the screw threads from bending and breaking down under the influence of such loads.

It is, therefore, important that the face contact, between the nut and screw thread profiles, should be developed in such a way that the influences of axial tensile load applied to the jointed structure have the least detrimental effect. Such a condition is created by the use of the fastener configuration in accordance with the present invention as described hereinabove with reference to FIG. 2, wherein the inventive nature of the asymmetrical thread profile geometry induces nut material flow such that the mating thread height at 65 is greater than that at 66, thereby meeting the conditions of improved performance capabilities.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A threaded fastener of the thread-forming type wherein there is defined, during driving thereof relative to a workpiece a combination of force couples and a resultant moment of said couples to develop material flow of the workpiece material about threads of said fastener to give face contact between the threads of the fastener and threads formed in the workpiece thereby for improved loading; said threaded fastener comprising: a threaded body portion defining an axis and a thread, and a driver head portion, said threaded body portion including a thread profile in axial cross-section having a plurality of zones including a first zone comprising a trailing thread face with respect to the direction of advancement of the fastener into the workpiece, which trailing thread face defines a first angle relative to the axis of said body portion and a second zone comprising a radiused forward thread face which defines a predetermined radius, a third zone comprising a tip portion of the thread wherein a forward face of said tip portion defines a second angle relative to the axis of the body portion and wherein said radiused forward thread face intersects said tip portion at a predetermined distance therealong relative to a total thread depth of said fastener, such that the material of the workpiece is induced to flow, during thread forming, generally radially inwardly and forwardly with respect to the direction of advancement of the fastener relative to the workpiece toward the trailing angled face for increased surface contact therewith to thereby achieve a high friction between the mating threads of the workpiece and the trailing face and to reduce the tendency for the fastener and workpiece to become loosened under externally applied forces in service, and to give an improved relation of tapping torque to stripping torque, and to reduce hoop stress in the material of the workpiece.

2. A fastener according to claim 1 wherein said forward face of said tip portion defines an angle relative to a diameter of said body of from substantially 20° to substantially 25°.

3. A fastener according to claim 1 wherein said radiused forward thread face intersects said tip portion at a depth of substantially 25% of the total thread depth of said fastener.

4. A fastener according to claim 1 wherein the radius of said radiused forward thread face is from substantially 0.27 to substantially 0.22 of the nominal diameter of the fastener.

5. A fastener according to claim 1 wherein said first angle is from substantially 100° to substantially 105°.

6. A threaded fastener of the thread-forming type wherein there is defined, during driving thereof relative to a workpiece a combination of force couples and a resultant moment of said couples to develop material flow of the workpiece material about threads of said fastener to give face contact between the threads of the fastener and threads formed in the workpiece thereby for improved loading; said threaded fastener comprising: a threaded body portion defining an axis and a thread, and a driver head portion, said threaded body portion including a thread profile in axial cross-section having a plurality of zones including a first zone comprising a trailing thread face with respect to the direction of advancement of the fastener into the workpiece, which trailing thread face defines a first angle from substantially 100° to substantially 105° relative to the axis of said body portion; and a second zone comprising a radiused forward thread face which defines a predetermined radius of from substantially 0.27 to substantially 0.22 of the nominal diameter of the fastener, such that the material of the workpiece is induced to flow, during thread forming, generally radially inwardly and forwardly with respect to the direction of advancement of the fastener relative to the workpiece toward the trailing angles face for increased surface contact therewith to thereby achieve a high friction between the mating threads of the workpiece and the trailing face and to reduce the tendency for the fastener and workpiece to become loosened under externally applied forces in service, and to give an improved relation of tapping torque to stripping torque, and to reduce hoop stress in the material of the workpiece; wherein said plurality of zones further include a third zone comprising a tip portion of the thread wherein a forward face of said tip portion defines a second angle relative to the axis of the body portion and wherein said radiused forward thread face intersects said tip portion at a predetermined distance therealong relative to the total thread depth of said fastener.

7. A fastener according to claim 6 wherein said radiused forward thread face intersects said tip portion at a depth of substantially 25% of the total thread depth of said fastener.

8. A fastener according to claim 6 wherein said forward face of said tip portion defines an angle relative to a diameter of said body of from substantially 20° to substantially 25°.

* * * * *